United States Patent
Togari et al.

(10) Patent No.: US 11,863,584 B2
(45) Date of Patent: Jan. 2, 2024

(54) INFECTION SPREAD ATTACK DETECTION DEVICE, ATTACK ORIGIN SPECIFICATION METHOD, AND PROGRAM

(71) Applicant: Nippon Telegraph and Telephone Corporation, Tokyo (JP)

(72) Inventors: Yukihiro Togari, Tokyo (JP); Hiroaki Maeda, Tokyo (JP); Hisashi Kojima, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 401 days.

(21) Appl. No.: 17/265,397

(22) PCT Filed: Aug. 1, 2019

(86) PCT No.: PCT/JP2019/030149
§ 371 (c)(1),
(2) Date: Feb. 2, 2021

(87) PCT Pub. No.: WO2020/027250
PCT Pub. Date: Feb. 6, 2020

(65) Prior Publication Data
US 2021/0306351 A1    Sep. 30, 2021

(30) Foreign Application Priority Data
Aug. 3, 2018   (JP) .................. 2018-146593

(51) Int. Cl.
*H04L 9/40*     (2022.01)
*G06N 5/04*     (2023.01)
*G06N 20/00*    (2019.01)

(52) U.S. Cl.
CPC ............. *H04L 63/145* (2013.01); *G06N 5/04* (2013.01); *G06N 20/00* (2019.01)

(58) Field of Classification Search
CPC ............................... H04L 63/145; G06N 5/04
See application file for complete search history.

(56) References Cited

U.S. PATENT DOCUMENTS

| | | | |
|---|---|---|---|
| 8,347,394 B1 * | 1/2013 | Lee ................ | G06F 21/554 726/25 |
| 9,542,556 B2 * | 1/2017 | Sanders ............ | H04L 63/02 |

(Continued)

OTHER PUBLICATIONS

Koyama, "About IoT security as a counter measure against cyber attacks," Cyber Security Task Force (2nd), NTT Communications, Mar. 8, 2017, 21 pages (with English Translation).

(Continued)

*Primary Examiner* — Viral S Lakhia
(74) *Attorney, Agent, or Firm* — Fish & Richardson P.C.

(57) ABSTRACT

An occurrence of an infection-spreading attack and an attack source thereof are detected with high accuracy. A first feature value is calculated based on traffic information regarding a packet forwarded by a forwarding device, and M partial address spaces to be monitored are specified based on the first feature value. A second feature value is calculated for each address of a terminal in a network, based on traffic information regarding the M partial address spaces, the second feature value is learned to classify terminal addresses into a plurality of clusters, and whether or not each of the clusters is an infection-spreading attack is determined to generate cluster information. Whether or not an infection-spreading attack has occurred and an address of a terminal that is an attack source are specified based on the second feature value and the cluster information.

13 Claims, 16 Drawing Sheets

(56) References Cited

U.S. PATENT DOCUMENTS

| | | | | |
|---|---|---|---|---|
| 9,565,202 | B1* | 2/2017 | Kindlund | H04L 63/145 |
| 10,397,248 | B2* | 8/2019 | Yamada | H04L 63/1416 |
| 10,454,777 | B2* | 10/2019 | Yang | G06N 20/00 |
| 11,159,548 | B2* | 10/2021 | Yagi | H04L 63/1433 |
| 2015/0310211 | A1* | 10/2015 | Mei | H04L 63/1408 |
| | | | | 726/23 |
| 2021/0042412 | A1* | 2/2021 | Isoyama | G06F 21/554 |

OTHER PUBLICATIONS

Lee et al., "Abnormal Behavior-Based Detection of Shodan and Censys-Like Scanning," IEEE, ICUFN, 2017, pp. 1048-1052.

Mazel et al., "Profiling Internet Scanners: Spatiotemporal Structures and Measurement Ethics," IEEE, 2017 Network Traffic Measurement and Analysis Conference (TMA), Jun. 21-23, 2017, 9 pages.

\* cited by examiner

| PARAMETER NAME | PARAMETER VALUE |
|---|---|
| TIME TAKEN TO ACQUIRE INFORMATION TO BE USED TO GENERATE FEATURE VALUE | 300 SECONDS |
| FEATURE VALUE A | NUMBER OF DESTINATIONS PER TRANSMISSION SOURCE IP FOR EACH TIME WIDTH |
| FEATURE VALUE B | DISTRIBUTION OF DESTINATIONS PER TRANSMISSION SOURCE IP FOR EACH TIME WIDTH |
| ... | ... |

Fig. 11

| ADDRESS SPACE | TIME SERIES 1 | TIME SERIES 2 | ... |
|---|---|---|---|
| x.0.0.0/8 | 8 | 2 | |
| y.0.0.0/8 | 10 | 1 | |
| ... | | | |

FEATURE VALUE (e.g. NUMBER OF TRANSMITTED PACKETS IN EACH TIME SERIES)

Fig. 12

FEATURE VALUE (e.g. NUMBER OF DESTINATIONS FOR EACH TRANSMISSION SOURCE AND DISTRIBUTION OF DESTINATIONS, NUMBER OF PORTS, ETC.)

| TRANSMISSION SOURCE ADDRESS | FEATURE VALUE A | FEATURE VALUE B | ... |
|---|---|---|---|
| z.0.0.1 | 8 | 2 | |
| z.0.0.2 | 10 | 1 | |
| ... | | | |

Fig. 13

| TRANSMISSION SOURCE ADDRESS | TIME SERIES-BASED FEATURE VALUE | TIME SERIES 1 | TIME SERIES 2 | ... |
|---|---|---|---|---|
| z.0.0.1 | OBSERVATION RESULT | 1 | 1 | |
| | VARIATION IN NUMBER OF DESTINATIONS | 1 | 0.8 | |
| z.0.0.2 | OBSERVATION RESULT | 0 | 1 | |
| | VARIATION IN NUMBER OF DESTINATIONS | 0.6 | 0.2 | |

| ITEM | CONTENT OF SETTING |
|---|---|
| TRAFFIC VOLUME THRESHOLD | X = 400 PACKETS (PER TIME WIDTH) |
| NUMBER OF ADDRESS SPACES IN WHICH ANOMALY DETECTION IS TO BE PERFORMED IN ADDRESS SPACE SET IN WHICH DETECTION CAN BE EFFECTIVELY PERFORMED | M = 10 |
| ... | ... |

| SETTING ITEM | CONTENT OF SETTING |
|---|---|
| ALGORITHM | K-Means |
| PARAMETER | NUMBER OF CLUSTERS = 5 |
| EXECUTION FREQUENCY AND INTERVAL | ONCE A MONTH |

Fig. 18

| LABEL | ITEM NAME | ITEM VALUE |
|---|---|---|
| NORMAL (CHECKING TERMINAL) | KNOWN IP ADDRESS | z. z. z. y |
| INFECTED | KNOWN MALWARE BEHAVIOR | BEHAVIOR INFORMATION AT CENTROID POSITION |
| NORMAL (CHECKING TERMINAL) | ACTIVITY PERIOD | TOP 10% |

Fig. 19

| CLUSTER | SETTING ITEM | SETTING INFORMATION |
|---|---|---|
| CLUSTER 1 | TRANSMISSION SOURCE ADDRESS | z. z. z. y |
| | TRANSMISSION SOURCE ADDRESS | z. z. z. x |
| | TRANSMISSION SOURCE ADDRESS | ... |
| | CENTROID | (5, 5, , 5) |
| | LABEL | NORMAL |
| CLUSTER 2 | ... | ... |

| ITEM | CONTENT OF SETTING |
|---|---|
| METHOD FOR ASSOCIATION WITH CLUSTER IN PAST TIME SERIES | SELECT CLUSTER WITH SHORTEST DISTANCE TO CENTROID |
| METHOD FOR CALCULATING DISTANCE TO CENTROID | |
| ... | |

INFECTION SPREAD ATTACK DETECTION DEVICE, ATTACK ORIGIN SPECIFICATION METHOD, AND PROGRAM

CROSS-REFERENCE TO RELATED APPLICATIONS

This application is a National Stage application under 35 U.S.C. § 371 of International Application No. PCT/JP2019/030149, having an International Filing Date of Aug. 1, 2019, which claims priority to Japanese Application Serial No. 2018-146593, filed on Aug. 3, 2018. The disclosure of the prior application is considered part of the disclosure of this application, and is incorporated in its entirety into this application.

TECHNICAL FIELD

The present invention relates to an infection-spreading attack detection system for detecting an infection-spreading attack by an infected terminal in a network.

BACKGROUND ART

In recent years, due to the spread of the IoT (Internet of Things), more and more terminals that do not have sufficient computing resources and cannot be secured are connected to the Internet. The number of owned devices per user is also increasing, and the number of unmanaged terminals is also expected to increase.

Meanwhile, recent years have seen an increase in the number of cases where attackers take over the aforementioned vulnerable user terminals via the Internet and maliciously use these terminals as springboards for cyber-attacks, and large-scale cyber-attacks such as denial-of-service (DDoS) attacks of several Tbps have been observed. If a large number of terminals are infected with malware and used as springboards for attackers from now on, there is a concern that the pressure on the network bandwidth and the burden on security mechanisms that deal with the attacks will increase in the future (see NPL 1).

Conventionally, a system has been proposed that aims to improve the security of user terminals and prevent a large-scale cyber-attack by preventing a terminal with inadequate security measures and user management from being used as springboards in a telecommunication carrier network, and detects an attack that turns terminals in the telecommunication carrier network into springboards (hereinafter referred to as "infection-spreading attack"). This system aims to reduce the security risk of a telecommunication carrier by detecting, in the network of the telecommunication carrier, unauthorized communication performed by infected terminals located in this network and perceiving a future attack pattern and the volume of attack in advance. Note that examples of infection-spreading attacks may include infectious activities of Telnet, worms, or the like.

The above system will be described. This system is, firstly: (1) traffic information regarding terminals located in a telecommunication carrier network is acquired over time for each partial address space, which is a subdivision of a communication destination address, in core routers or the like in the telecommunication carrier network using an access control list (ACL). In the case of IPv4 (Internet Protocol version 4) packets, examples of subdividing an address space include a method of subdividing a 32-bit address space using an upper 8-bit value. The traffic information to be acquired is the number of packets per predetermined sampling time. Note that the aforementioned ACL refers to information in which conditions of addresses or the like for controlling packets and a method for controlling packets that match the conditions are described.

Next, (2) the traffic information acquired over time is aggregated for each partial address space in a predetermined aggregation time range, and the aggregated traffic information for each partial address space is vectorized. The vector obtained through this processing is a scalar value whose number of dimensions is the number of subdivisions of the partial address spaces and whose element is the aggregated traffic information. Then, (3) a discriminator (threshold) is created by performing machine learning processing through unsupervised learning using this vectorized traffic information.

Next, (4) when detection is performed, the vectorized traffic information at a certain point in time is acquired in the same manner as (1) and (2) above. It is then determined whether or not this traffic information is normal or abnormal, using the discriminator. An infection-spreading attack can thus be detected. If an infection-spreading attack is detected, a core router is set such that subsequent packets will be a predetermined security device. The security device performs further detailed analysis, and specifies the terminal that is carrying out the infection-spreading attack.

It is known that, in a space with a low traffic volume, there is a relatively high number of communications related to infection-spreading attacks with respect to normal communications. For this reason, the above system is expected to be able to also catch a change due to a small amount of attack.

CITATION LIST

Non Patent Literature

[NPL 1] KOYAMA Satoru, "Cyber Kougeki Taisaku toshiteno IoT Security nitsuite (IoT Security as Measures Against Cyber-Attack)", [online], Cyber Security Task Force (Second time), Ministry of Internal Affairs and Communications, [Searched Jul. 6, 2018], Internet <URL: http://www.soumu.go.jp/main_content/000471279.pdf>

[NPL 2] Johan Mazel and two others, "Profiling Internet Scanners: Spatiotemporal Structures and Measurement Ethics", 2016

[NPL 3] Seungwoon Leel and two others, "Abnormal Behavior-Based Detection of Shodan and Censys-Like Scanning", IEEE, ICUFN 2017, pp. 1048-1052, 2017

SUMMARY OF THE INVENTION

Technical Problem

The above system enables highly accurate detection of an occurrence of an infection-spreading attack. However, the traffic pulled into the security device is all traffic addressed to the detected partial address space, and this traffic also includes that of normal communication. As a result, not only is the load of analysis processing on the security device heavy, but also the network load is also high due to an occurrence of traffic related to normal communication that is bypassed to the security device.

To solve the above problem, a technology for specifying the address of the infected terminal is needed, but the above system cannot specify information regarding a transmission source address that triggers a pull into the security device.

In order to specify the address of the infected terminal, it is necessary to determine whether the traffic is caused by a normal terminal or an infected terminal. For the purpose of sharing security information, there are systems such as "Shodan" and "Censys", which performs a scan on all ports of a terminal connected to the Internet, checks if, for example, any vulnerable port is available, and create a database of such ports (see NPL 2 and NPL 3). Since the traffic pertaining to this check does not pertain to an infection-spreading attack, it is necessary to distinguish between traffic pertaining to the check and traffic pertaining to an infection-spreading attack in order to specify infected terminals.

In NPL 3, attention is paid to behavior of Banner Grabbing (an action to read a character string on a login screen to specify a manufacturer), which is unique to normal scanning. A detailed feature value such as a packet arrival interval is extracted for each transmission source address, and clustering of transmission sources is performed to identify a scan transmission source as a terminal pertaining to the check.

However, the identification is difficult because communication characteristics during a scan are very similar between scans by infected terminals and normal scans. This is because, in a typical check scan, vulnerability of a terminal is checked by simulating an attack from an infected terminal, and is thus substantially identical, in properties, to a scan by an infected terminal. In addition, malware also exists that exhibits behavior equivalent to Banner Grabbing.

The present invention has been made in view of the foregoing circumstances, and an object of the invention is to provide an infection-spreading attack detection apparatus, a method for specifying an attack source terminal, and a program that enable highly accurate detection of an occurrence of an infection-spreading attack and a source of the attack.

Means for Solving the Problem

To achieve the above-stated object, the invention in the present application is an infection-spreading attack detection apparatus that detects an occurrence of an infection-spreading attack in a network in which a forwarding device for forwarding packets is provided, the apparatus including: first feature value deriving means for acquiring first traffic information regarding a packet forwarded by the forwarding device, and deriving a first feature value of traffic based on the first traffic information for a plurality of partial address spaces obtained by subdividing an address space of the network; monitoring target determination means for determining M partial address spaces that are to be monitored, out of the plurality of partial address spaces, based on the first feature value derived by the first feature value deriving means; second feature value deriving means for acquiring second traffic information regarding a packet forwarded by the forwarding device, a destination or a transmission source of the packet being an address in the M partial address spaces determined by the monitoring target determination means, and deriving a second feature value of the traffic based on the second traffic information, for each address of a terminal located in the network; clustering means for learning the second feature value derived by the second feature value deriving means and classifying addresses of terminals into a plurality of clusters, and determining whether or not each of the clusters pertains to an infection-spreading attack and generating cluster information; and terminal specification means for specifying whether or not an infection-spreading attack has occurred and an address of a terminal that is an attack source, based on the second feature value derived by the second feature value deriving means and the cluster information generated by the clustering means.

Effects of the Invention

According to the present invention, the number of partial address spaces to be monitored is limited to M based on the first feature value derived from the traffic information. Thus, clustering processing based on the second feature value that is derived for each terminal address from the traffic information in each of the limited partial address spaces can be carried out at low load. In addition, since the clustering processing is based on the second feature value derived for each terminal address, it is possible to specify an occurrence of an infection-spreading attack and the address of the attack source terminal with high accuracy.

BRIEF DESCRIPTION OF DRAWINGS

FIG. 11 shows an example of a traffic trend analysis feature value holding table.

FIG. 12 is an example of a clustering feature value holding table.

FIG. 13 shows an example of a detection time-series feature value holding table.

FIG. 18 shows an example of a mapping information table.

FIG. 19 shows an example of a cluster information table.

DESCRIPTION OF EMBODIMENTS

First, an overview of an infection-spreading attack detection system according to the present invention will be described. Note that, in the following description, "transmission source" and "destination" of communication are based on a direction from a terminal located in a network toward the outside of the network, unless otherwise stated.

The present invention is for detecting an infection-spreading attack on an entire address space carried out by a malware-infected terminal located in a network, such as a telecommunication carrier network, and further specifying the address of the terminal that carried out the infection-spreading attack. Also, the present invention pays attention to not only feature values that capture the properties of communication when a scan is performed, but also features of communication that are based on differences in the mode of operation and the purpose of use of each scan, as features that separate normal scans and attacking scans from each other. The differences in the mode of operation and the purpose of use may include the followings, for example.

Example 1: Period in which IP Address of Terminal is Observed

In the case of a normal scan, the IP address of a terminal is observed for a long period. On the other hand, in the case of an attacking scan, the IP address of a terminal begins to be observed in association with prevalence of malware infection. In addition, in the case of an attacking scan, interruptions occur to avoid detection.

Example 2: Duration of One Attack Activity

This duration can be used by processing it into a form of standard deviation or the like of the number of destinations for past M time slots. In the case of a normal scan, attack continues to occur at a certain rate. On the other hand, in the case of an attacking scan, the duration of the attack activity is shorter than that of a normal scan. In addition, in the case of an attacking scan, there is an influence of use of a terminal (e.g. turning on/off of the power etc.) by a normal user who is unaware that the terminal is infected.

Example 3: Distribution of Number of Packets in One Flow

In the case of a normal scan, a dictionary attack is not performed after a scan in many cases, and the number of packets transmitted to a target terminal is substantially constant. In the case of carrying out a dictionary attack after an attacking scan, the number of packets increases for the flow at the time of the dictionary attack.

In the present invention, an occurrence of an infection-spreading attack is detected and an attack source is specified through three steps, namely: (1) acquisition of traffic information used in detection; (2) learning of a normal state by means of clustering; and (3) determination of a terminal observed in a current time slot.

(1) Acquisition of Traffic Information Used in Detection

Figure 1:
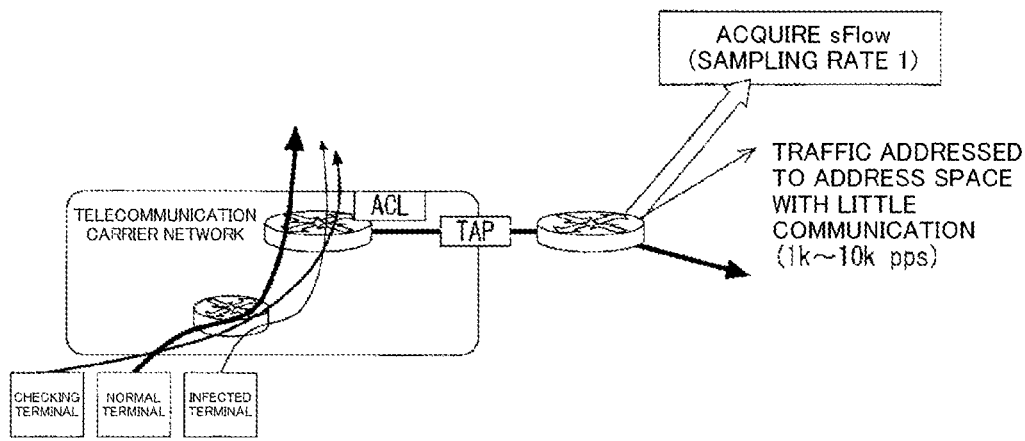
FIG. 1 is a diagram illustrating acquisition of traffic information.

As shown in FIG. 1, a setting to count the number of packets for each destination address space is submitted to an ACL (access control list) or the like of a network device in a telecommunication carrier network, and an address space with little communication is specified. For example, the ACL of a central router is caused to count the number of transmitted packets in units of destination/8 addresses. Then, sFlow information regarding traffic addressed to the address space with little communication is acquired.

(2) Learning of Normal State by Means of Clustering

Figure 2:
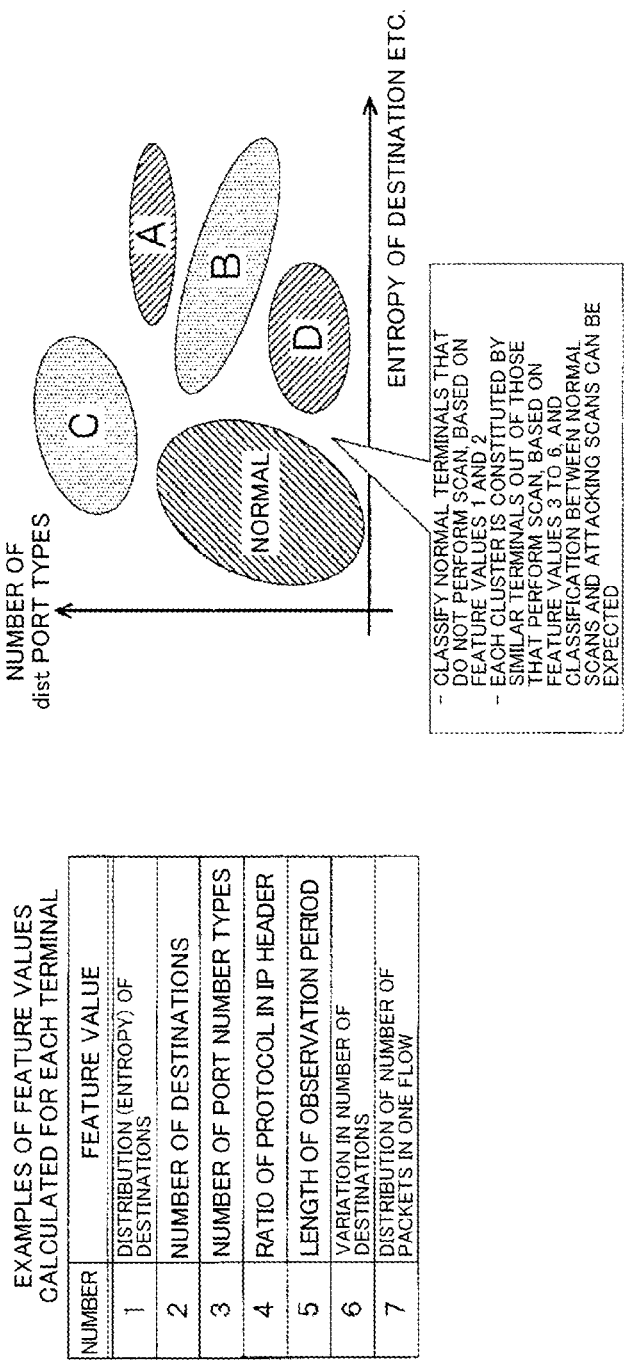
FIG. 2 is a diagram illustrating learning of a normal state by means of clustering.

As shown in FIG. 2, an sFlow log is analyzed in a certain fixed period (e.g. one month), and the following feature values are acquired for each transmission source. Transmission sources with similar communication characteristics are classified into the same cluster by inputting the feature values to an existing clustering algorithm (e.g. DBSCAN: Density-Based Spatial Clustering of Applications with Noise, GMM: Gaussian Mixture Model, CluStream). These feature values correspond to "second feature values" of the claims. Note that the graph shown as an example on the right side of FIG. 2 is a two-dimensional representation of the distribution of clusters for facilitating understanding of the invention, and actually has the number of dimensions that corresponds to the number of feature values.

Feature values may include: 1. the distribution (entropy) of destinations; 2. the number of destinations; 3. the number of port number types; 4. the ratio of the protocol in the IP header; 5. the length of an observation period; 6. dispersion of the number of destinations; and 7. the distribution of the number of packets in one flow. Each of these features is for distinguishing between normal communication and random scan, and clustering including these feature values enables classification of normal terminals that do not perform scan. In particular, 5. the length of an observation period, 6. dispersion of the number of destinations, and 7. the distribution of the number of packets in one flow are feature values for classifying the properties of a scan (e.g. malware unit, investigative organization unit etc.), and clusters are formed by similar scans through clustering including these feature values. That is to say, the feature values 5 to 7 are those that capture differences in the mode of operation and the purpose of use of scan, and normal scans and attacking scans can be expected to be classified through clustering including these feature values.

(3) Determination of Terminal Observed in Current Time Slot

Figure 3:
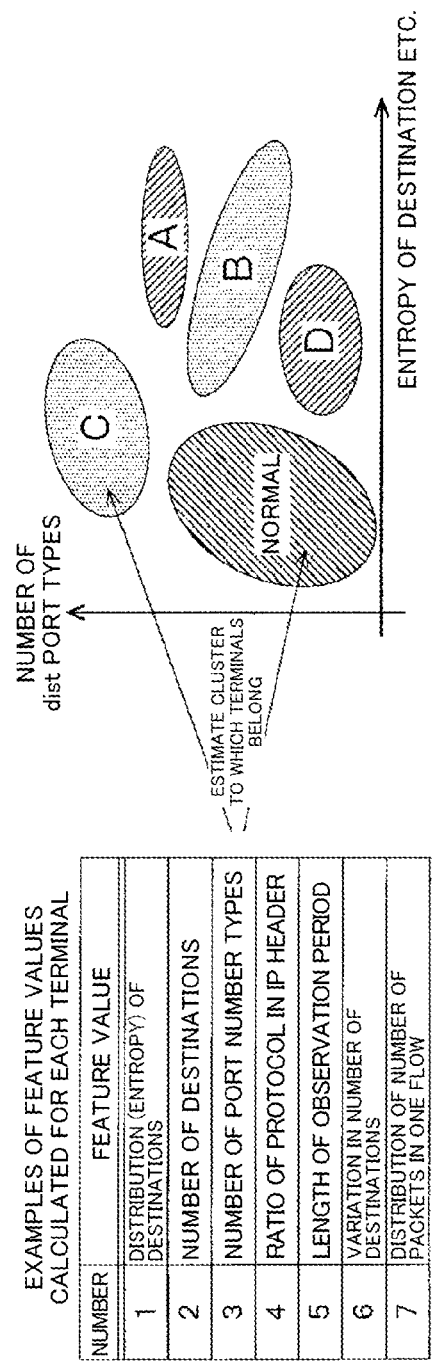
FIG. 3 is a diagram illustrating determination of a terminal observed in a current time slot.

As shown in FIG. 3, a cluster to which a terminal observed in the current time slot belongs is determined using the centroid of clusters generated during the learning period and information regarding terminals belonging to the respective clusters. For example, the feature values of a transmission source in the current time slot are calculated. Then, the distances to the centroids of the respective clusters are compared, and the terminal is assigned to the cluster with the closest distance.

Figure 4:
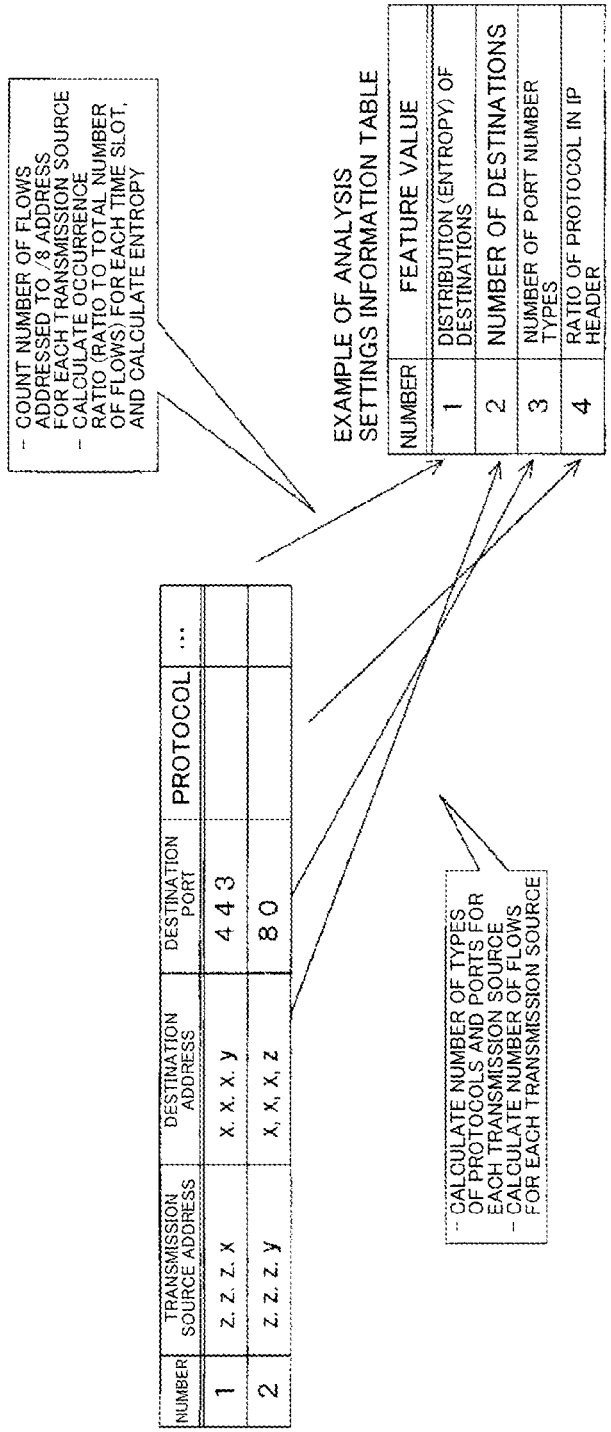
FIG. 4 is a diagram illustrating example calculation of a second feature value.
Figure 5:
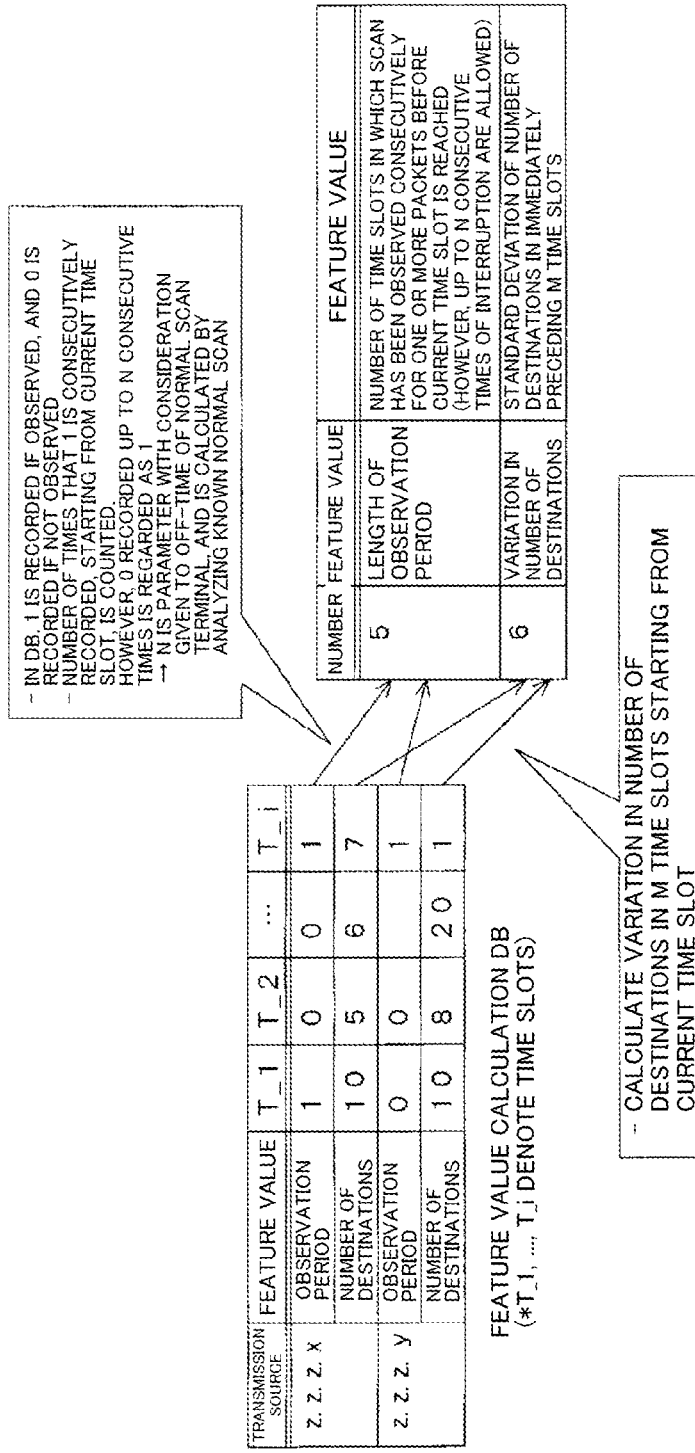
FIG. 5 is a diagram illustrating example calculation of the second feature value.

An example of a method for calculating the feature values of (2) above will be described with reference to FIGS. 4 and 5. For example, L3-4 header information in sFlow is acquired, and the feature values used in clustering are calculated every fixed time. Specifically, regarding the feature values 1 to 4 above, the number of flows addressed to the/8 address is counted for each transmission source as shown in FIG. 4. Furthermore, an occurrence ratio (a ratio to the total number of flows) is calculated for each time slot, and the entropy is calculated. Furthermore, the numbers of types of protocols and ports are calculated for each transmission source. Further, the number of flows is calculated for each transmission source. Thus, the feature values used in clustering are calculated.

Also, for example, the feature values in the past time slots are held in a table, and the feature values used in clustering are calculated by processing the held feature values every fixed time. Specifically, as for the feature value 5 above, 1 is recorded in the feature value calculation DB if a terminal has been observed, 0 is recorded if not observed, in the feature value calculation DB. Then, the number of times that 1 is consecutively recorded is counted, starting from the current time slot, as shown in FIG. 5. However, 0 recorded up to N consecutive times is regarded as 1. That is to say, up to N consecutive times of interruption is allowed. Here, N is a parameter with consideration given to an off-time of a normal scan terminal, and is calculated by analyzing a known normal scan. As for the feature value 6 above, dispersion of the number of destinations over M time slots starting from the current time slot is calculated. More specifically, the standard deviation of the number of destinations in immediately preceding M time slots is used as the feature value.

An example of a method for analyzing the clustering result in (3) above will be described. Clusters obtained as a result of the clustering are analyzed in accordance with the following rules, and are classified into a cluster to which normal scan terminals belong and a cluster to which infected terminals belong.

Rule 1: A cluster that contains a public IP address of a normal scan terminal is regarded as a cluster of normal scan terminals.

Rule 2: Communication information for distinguishing between normal communication and random scan at the centroid of a cluster is matched with behavior of known malware, and a matched cluster is regarded as a cluster of infected terminals.

Rule 3: Values of the aforementioned feature values at the centroids of clusters are compared with each other, and for example, a cluster of the top 10% in terms of the length of the activity period is regarded as a cluster of normal scan terminals.

Figure 6:
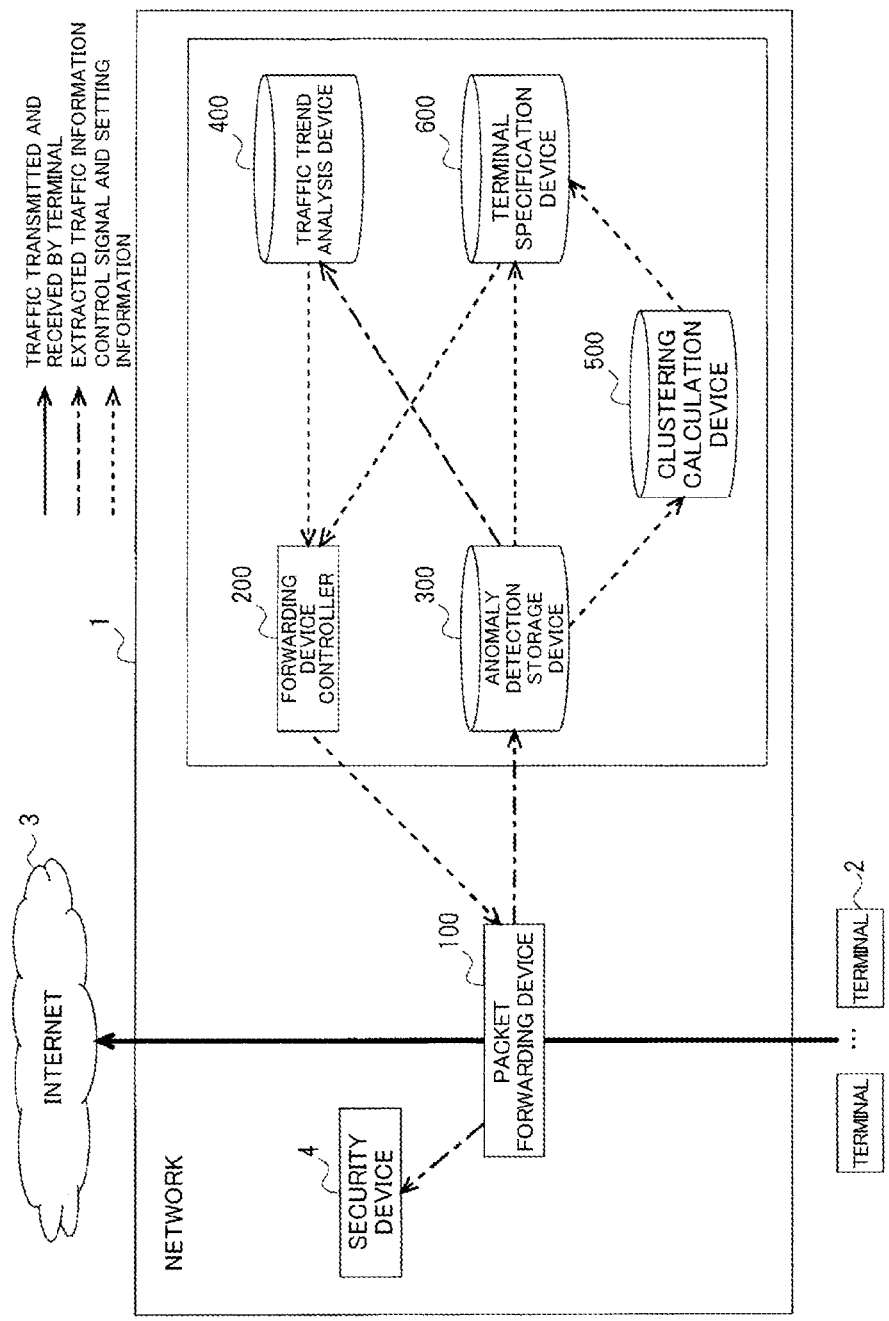
FIG. 6 shows an example of a network configuration of an infection-spreading attack detection system.

Next, the infection-spreading attack detection system according to an embodiment of the present invention will be described with reference to FIG. 6. FIG. 6 shows an example of a network configuration of the infection-spreading attack detection system. As shown in FIG. 6, a large number of terminals 2 are located in a network 1 of a telecommunication carrier network or the like. The network 1 is a large-scale IP network to which a large number of terminals 2 are connected. The terminals 2 may have any communication characteristics (e.g. communication frequency, the number of destinations, packet size etc.). The terminals 2 may include not only terminals operated by users but also IoT terminals. The line that connects the terminals 2 to the network 1 may be of any type, and may be either a wireless communication line or a wired communication line. The network 1 is connected to the Internet 3. The carrier of the network 1 provides the terminals 2 with a service for connection to the Internet 3. A packet forwarding device 100 is disposed in the network 1. A known security device 4 that performs detailed analysis of infection-spreading attacks is also disposed in the network 1.

The packet forwarding device 100 is a device that relays packets between the Internet 3 and the terminals 2. Examples of the packet forwarding device 100 may include a network device such as a router in a core network of a telecommunication carrier network. Any number of packet forwarding devices 100 may be provided in the network 1.

In the present embodiment, a forwarding device controller 200, an anomaly detection storage device 300, a traffic trend analysis device 400, a clustering calculation device 500, and a terminal specification device 600 are provided as an anomaly detection device group. Here the anomaly detection storage device 300 corresponds to "first feature value deriving means" and "second feature value deriving means" in the claims. The traffic trend analysis device 400 corresponds to "monitoring target determination means" in the claims. The clustering calculation device 500 corresponds to "clustering means" in the claims. The terminal specification device 600 corresponds to "terminal specification means" in the claims.

These devices may be mounted in any mode. For example, each of the devices is mainly constituted by a semiconductor device, and can be configured as a so-called information processing device that has a CPU (Central Processing Unit), a volatile storage device such as a RAM (Random Access Memory), a nonvolatile storage device such as a hard disk or a flash memory, and a communication interface that performs connection for communication with an external device. The devices may be configured by installing a program in a general-purpose server, or may be configured as a dedicated hardware device that incorporates a program. Also, for example, any combination of the devices may be mounted in one hardware device. Also, for example, the devices may be mounted in a virtual machine that is built in a virtual environment.

Although, in the present embodiment, the anomaly detection device group is provided for each packet forwarding device 100, one anomaly detection device group may be provided for more than one packet forwarding devices 100.

When relaying packets, the packet forwarding device 100 collects, using an ACL, information such as the number of packets transmitted and received for each address space (e.g. /8 address space etc.), and forwards the collected information to the anomaly detection storage device 300.

The anomaly detection storage device 300 processes traffic information in each time series into information (first feature values) to be used to specify a set of M partial address spaces in which detection can be effectively performed, and transmits the processed information to the traffic trend analysis device 400.

The traffic trend analysis device 400 analyzes the first feature values for a fixed time, and specifies, as a monitoring target, a set of M partial address spaces in which detection can be effectively performed (e.g. M partial address spaces in which the traffic volume is constantly low). Also, a setting to collect traffic information in the M address spaces via the forwarding device controller 200 is submitted to the packet forwarding device 100.

After submitting the setting to the packet forwarding device 100, the packet forwarding device 100 only transmits traffic information regarding the M address spaces in which detection can be effectively performed, to the anomaly detection storage device 300.

The anomaly detection storage device 300 accumulates traffic information in each time series, processes the accumulated traffic information to information (the second feature values) to be used in learning and detection by means of clustering, and transmits the processed information to the clustering calculation device 500 and the terminal specification device 600.

The clustering calculation device 500 receives the second feature values in the traffic information for a fixed period from the anomaly detection storage device 300, and carries out clustering. As a result, a plurality of clusters corresponding to the trend of infection-spreading attacks carried out by terminals 2 are mapped onto a feature value space. Furthermore, significance is given to the clusters using the past observation information or the like.

The terminal specification device 600 receives the result of clustering the terminals 2 from the clustering calculation device 500. Also, the terminal specification device 600 receives second feature value information in each time series from the anomaly detection storage device 300, and separates infected terminals and normal scan terminals from each other in each cluster, based on the received second feature value information. Furthermore, if an infected terminal is extracted, routing of the packet forwarding device 100 is changed via the forwarding device controller 200, and subsequent traffic is input to a predetermined security device 4 and examined minutely.

An example of functional configurations of the devices that constitute the anomaly detection device group will be described below.

Figure 7:
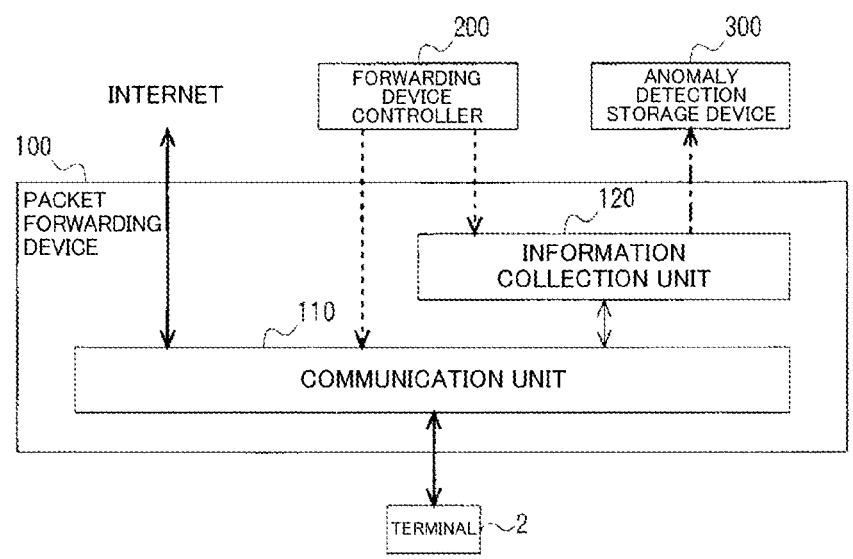
FIG. 7 shows an example of a functional configuration of a packet forwarding device.

First, an example of a functional configuration of the packet forwarding device 100 will be described with reference to FIG. 7. As shown in FIG. 7, the packet forwarding device 100 includes a communication unit 110 that relays packets transmitted from the terminals 2 to the Internet 3 and also relays, to the terminals 2, packets addressed to the terminals 2 from the Internet 3.

Also, the packet forwarding device 100 includes an information collection unit 120 that sets, to the ACL, conditions of each piece of attribute information (e.g. address, transmission source IP address) of a communication packet, and thus transmits the number of packets that match the conditions in a predetermined sampling time as traffic information to the anomaly detection storage device 300. A plurality of ACLs can be set per packet forwarding device 100, and the application timing thereof is before or after forwarding and is not limited. If the set capacity of the ACLs is insufficient in a hierarchical network, it is also possible to set different ACLs for different layers and share functions, and the ACLs may be set at any location. The information collection unit 120 specifies address spaces with little communication in the traffic trend analysis device 400, then acquires sFlow (traffic information that corresponds to the L3-L4 header) to the address bands of the specified address spaces based on the information, and transmits the acquired sFlow to the anomaly detection storage device 300. The ACL and sFlow may be set in one packet forwarding device 100, or may be separately set in different packet forwarding devices 100 in the same layer.

The setting regarding information that is to be collected in the information collection unit 120 and the setting of routing in the communication unit 110 are determined based on an instruction from the forwarding device controller 200. Traffic information to be transmitted to the anomaly detection storage device 300 by the information collection unit 120 is considered to be not only the ACL and sFlow as mentioned above, but also an IP header, a full capture, or the like. The following description will be given, taking the ACL and sFlow as an example.

Figure 8:
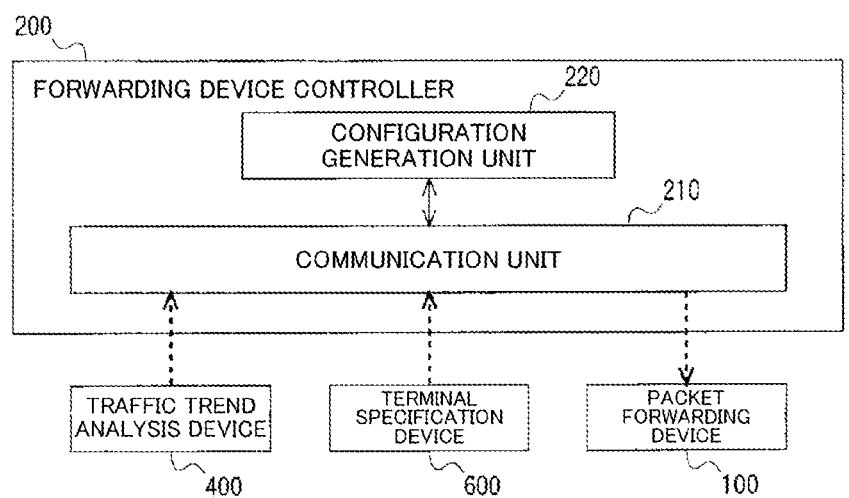
FIG. 8 shows an example of a functional configuration of a forwarding device controller.

Next, an example of a functional configuration of the forwarding device controller 200 will be described with reference to FIG. 8. As shown in FIG. 8, the forwarding device controller 200 includes a communication unit 210, which is a communication interface, and a configuration generation unit 220.

The configuration generation unit 220 receives input of information related to settings of the packet forwarding device 100, such as sFlow setting information, ACL setting information, and routing setting information, from the outside of the system (including the traffic trend analysis device 400 and the terminal specification device 600), and has a function of generating a configuration of the packet forwarding device 100 to pull only a specific flow into the security device 4, for example. The generated configuration is transmitted to the packet forwarding device 100 and is set.

Next, an example of a functional configuration of the anomaly detection storage device 300 will be described with reference to FIG. 9. The anomaly detection storage device 300 includes a communication unit 310, which is a communication interface, a feature value processing calculation unit 320 that processes the current traffic information acquired from the packet forwarding device 100 into the first feature values and the second feature values (e.g. the number of destinations for each transmission source address at fixed time intervals, the number of protocol types and statistics deriving therefrom), and a feature value processing setting information table 330 that holds settings of the feature value processing.

The anomaly detection storage device 300 holds calculated feature values in various tables, as necessary. To hold the feature values, the feature values, such as the first feature values to be used in traffic trend analysis and the second feature values to be used in clustering, may be separately held in different tables depending on the usage, or may be bundled into the same table. Also, tables are also prepared that holds the feature values for each time series in order to calculate the feature values to be used in clustering (specifically, detection processing using clusters). In the present embodiment, a traffic trend analysis feature value holding table 340, a clustering feature value holding table 350, and a detection time-series feature value holding table 360 are provided as shown in FIG. 9. The anomaly detection storage device 300 also includes an information management unit 370, which is an interface between the feature value processing calculation unit 320 and the tables 330 to 360. These pieces of feature value information are transmitted to the traffic trend analysis device 400, the clustering calculation device 500, and the terminal specification device 600.

Figures 9, 10:
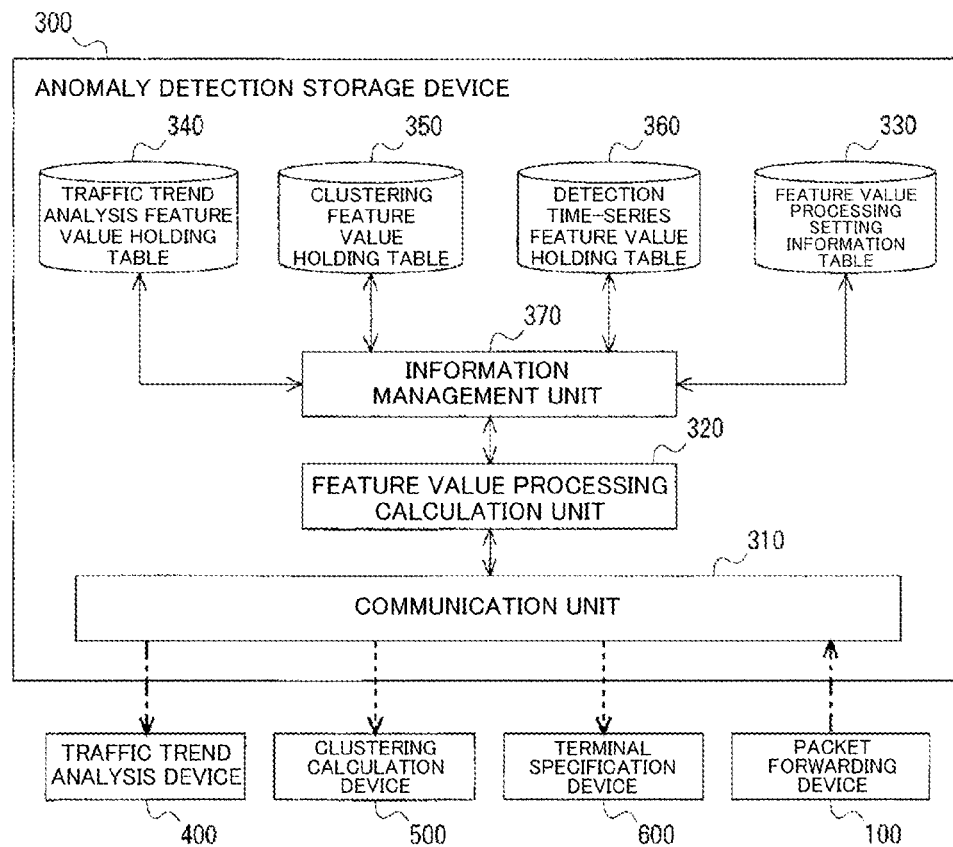
FIG. 9 shows an example of a functional configuration of an anomaly detection storage device.
FIG. 10 shows an example of a feature value processing setting information table.

As shown in an example in FIG. 10, the feature value processing setting information table 330 holds the time width for processing the feature values, and a method for processing information acquired from the packet forwarding device 100. Based on these pieces of information, the feature value processing calculation unit 320 calculates the first feature values for traffic trend analysis and the second feature values for clustering.

The traffic trend analysis feature value holding table 340 is a table that holds, for each time series, a feature value acquired for each address space in which detection can be effectively performed. In an example in FIG. 11, the number of packets, which is the first feature value, is stored for each address space as a predetermined unit. Here, the unit may be taken in any manner. Any value may be used as the first feature value, and the first feature value may have any number of dimensions. Note that although one table is created for each network device in the example in FIG. 11, information acquired from a plurality of network devices may be stored in one table. These pieces of information are used by the traffic trend analysis device 400.

As for the clustering feature value holding table 350, the second feature values are calculated based on the content of setting in the feature value processing setting information table 330 for each transmission source address that is limited to an IP address in the network, and the calculation result is stored in this table, as shown in an example in FIG. 12. Examples of the second feature values are as mentioned above with reference to FIG. 2. These pieces of information are used by the clustering calculation device 500.

As for a feature value indicating the length of an observation period and a feature value indicating dispersion of the number of destinations, for example, in the time series used in clustering, an observed value needs to be stored for each time series (time slot) and processed over a plurality of time series. As shown in an example in FIG. 13, the detection time-series feature value holding table 360 holds observation information, which serves as a source to be used in calculation of these feature values. The held results are processed again by the feature value processing calculation unit 320, and are stored in the clustering feature value holding table 350.

Figures 14, 15:
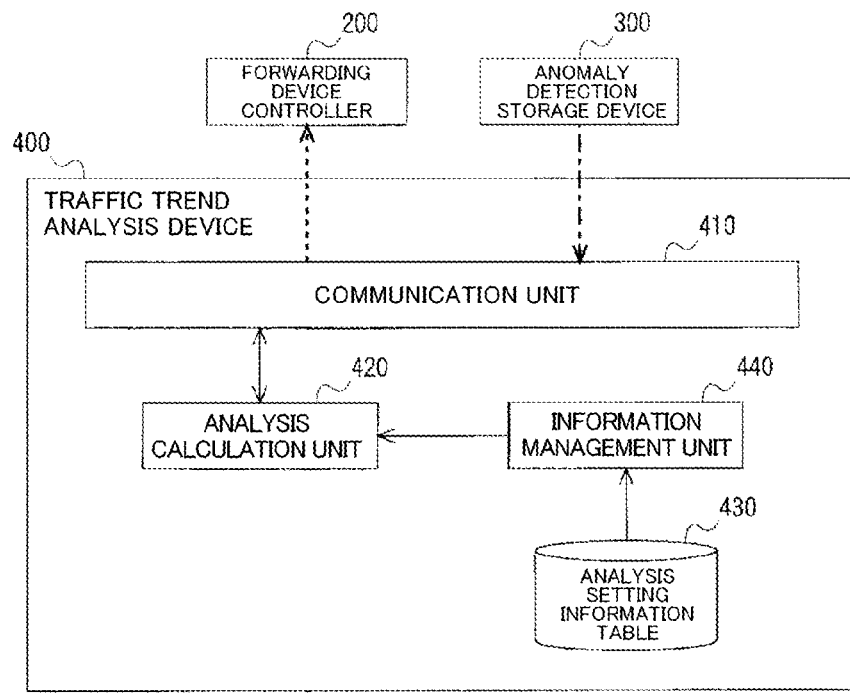
FIG. 14 shows an example of a functional configuration of a traffic trend analysis device.
FIG. 15 shows an example of an analysis settings information table.

Next, an example of a functional configuration of the traffic trend analysis device 400 will be described with reference to FIG. 14. As shown in FIG. 14, the traffic trend analysis device 400 includes a communication unit 410, which is a communication interface, an analysis calculation unit 420 that performs analysis based on the first feature values acquired from the anomaly detection storage device 300 and specifies, as a monitoring target, an address space set (e.g., address spaces with low traffic volume) in which detection can be effectively performed, an analysis settings information table 430 that holds various kinds of setting information used in analysis processing in the analysis calculation unit 420, and an information management unit 440, which is an interface for the analysis calculation unit 420 and the analysis settings information table 430. The analysis calculation unit 420 analyzes information (e.g. M partial address spaces with low traffic volume) for acquiring traffic information required to derive the second feature values in the packet forwarding device 100.

The analysis settings information table 430 holds various kinds of setting information required for the aforementioned analysis processing. Specifically, as shown in an example in FIG. 15, the analysis settings information table 430 holds information such as a method for specifying a partial address space with low traffic volume, a threshold for traffic volume, and the number of partial address spaces for which anomaly detection is to be performed.

Here, a threshold X for traffic volume is an example of a parameter that defines a partial address space set in which detection can be effectively performed. In this example, an address space in which the traffic volume constantly falls below the threshold X is regarded as an address space in which detection can be effectively performed. For example, the threshold X can be calculated based on the amount of attack to be detected (e.g. a target value of infected terminals x the amount of attack per infected terminal), the distribution of attack targets (e.g. a uniform distribution or a distribution in which attack targets concentrate on a plurality of address spaces), or the like.

Note that, in the procedure described as an example in FIG. 15, anomaly detection does not need to be performed in all of the address spaces that fall below the threshold X. In this case, for example, a parameter M may be explicitly defined, and the number of address spaces for which anomaly detection is to be performed may be ultimately designated. Also, although FIG. 15 shows an example in which a user sets the threshold X, an address space set that is effective for detection may be specified using a clustering algorithm such as K-Means.

Figures 16, 17:
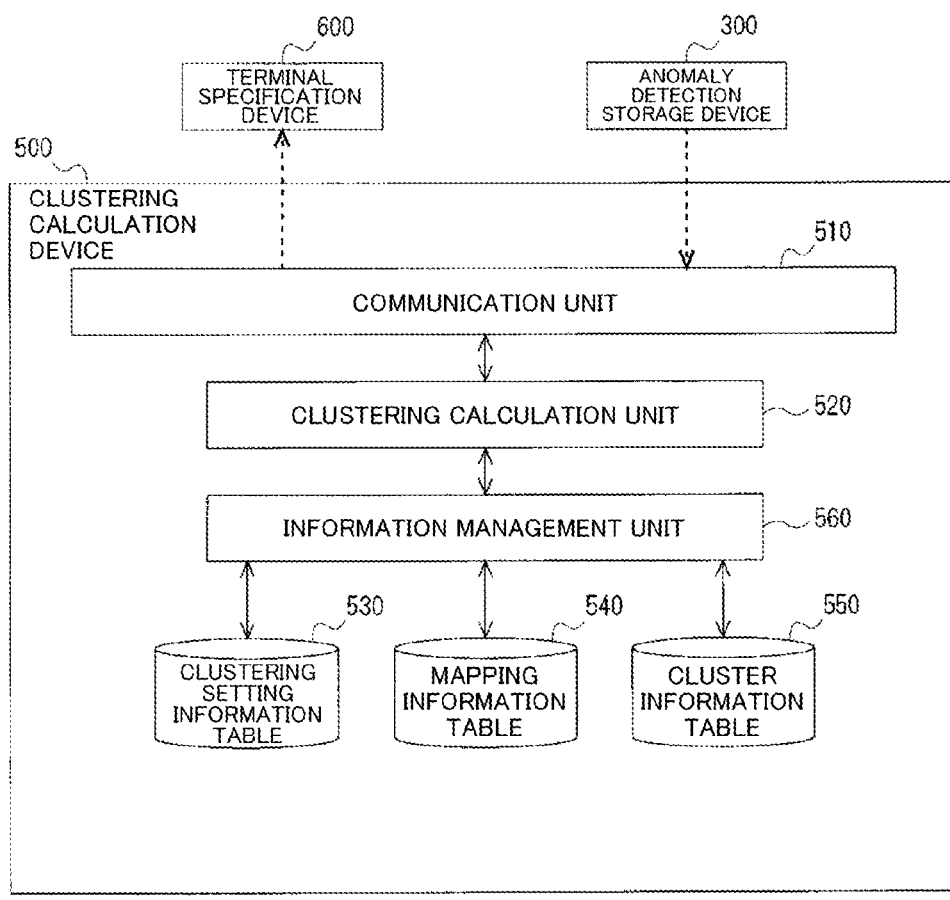
FIG. 16 shows an example of a functional configuration of a clustering calculation device.
FIG. 17 shows an example of a clustering setting information table.

Next, a functional configuration of the clustering calculation device 500 will be described with reference to FIG. 16. As shown in FIG. 16, the clustering calculation device 500 includes a communication unit 510, which is a communication interface, a clustering calculation unit 520, a clustering setting information table 530 that holds various kinds of setting information to be used in clustering, a mapping information table 540 that holds mapping information to be used in mapping of clustering, a cluster information table 550 that holds cluster information that is the clustering result, and an information management unit 560, which is an interface for the clustering calculation unit 520 and the tables 530 to 550. The clustering calculation unit 520 performs clustering based on the second feature values acquired from the anomaly detection storage device 300, information in the clustering setting information table 530, and information in the mapping information table 540, and stores the results in the cluster information table 550.

The clustering setting information table 530 is a table that holds setting information related to clustering, and holds, specifically, a clustering algorithm (e.g. K-Means, non-hierarchical clustering, a generation model etc.), a parameter thereof, and the interval at which clustering is performed, as shown in an example in FIG. 17. The clustering calculation unit 520 performs clustering calculation in accordance with these pieces of information.

As shown in an example in FIG. 18, the mapping information table 540 holds rules for analyzing whether a calculated cluster is one pertaining to a normal scan or an attacking scan, and known information that is also used in analysis processing that is performed based on these rules. Specifically, the mapping information table 540 holds various kinds of information associated with the aforementioned rules 1 to 3. The clustering calculation unit 520 analyzes and maps clusters, i.e. gives significance to each cluster, in accordance with these pieces of information.

The cluster information table 550 is a table that holds the result of clustering performed by the clustering calculation unit 520, and holds information representing IP addresses of transmission source terminals that are constituent elements of each cluster, and the centroid and a label of each cluster, as shown in an example in FIG. 19. These pieces of data are transmitted to the terminal specification device 600.

Figures 20, 21:
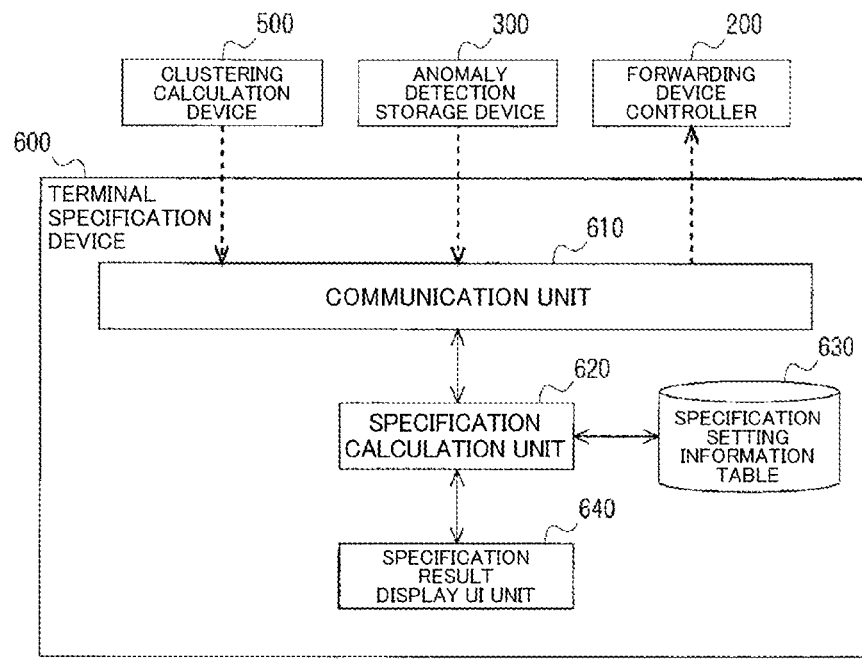
FIG. 20 shows an example of a functional configuration of a terminal specification device.
FIG. 21 shows an example of a specification setting information table.

Next, a functional configuration of the terminal specification device 600 will be described with reference to FIG. 20. As shown in FIG. 20, the terminal specification device 600 includes a communication unit 610, which is a communication interface, a specification calculation unit 620 that specifies whether or not an infection-spreading attack has occurred and an attack source terminal of this attack, a specification setting information table 630 that holds setting information to be used in the specification calculation unit 620, and a specification result display user interface unit 640 that displays the specification results. The specification calculation unit 620 acquires the second feature values of traffic in the current time series from the anomaly detection storage device 300. The specification calculation unit 620 also receives information representing the clustering results calculated based on the past traffic information, from the clustering calculation device 500. The specification calculation unit 620 specifies the cluster to which each of the terminals observed in the current time series belongs to, in accordance with the above received information and the calculation method defined in the specification setting information table 630. The specification result is transmitted to the forwarding device controller 200 and is also displayed on the specification result display user interface unit 640.

As shown in an example in FIG. 21, the specification setting information table 630 holds information required to specify the cluster to which each of the terminals observed in the current time series belongs to. As a method for associating each terminal with a cluster, for example, a method is conceivable in which the distance between the centroid of each cluster and the feature value in the current time series is calculated, and the terminal is allocated to a cluster with the shortest distance.

Figure 22:
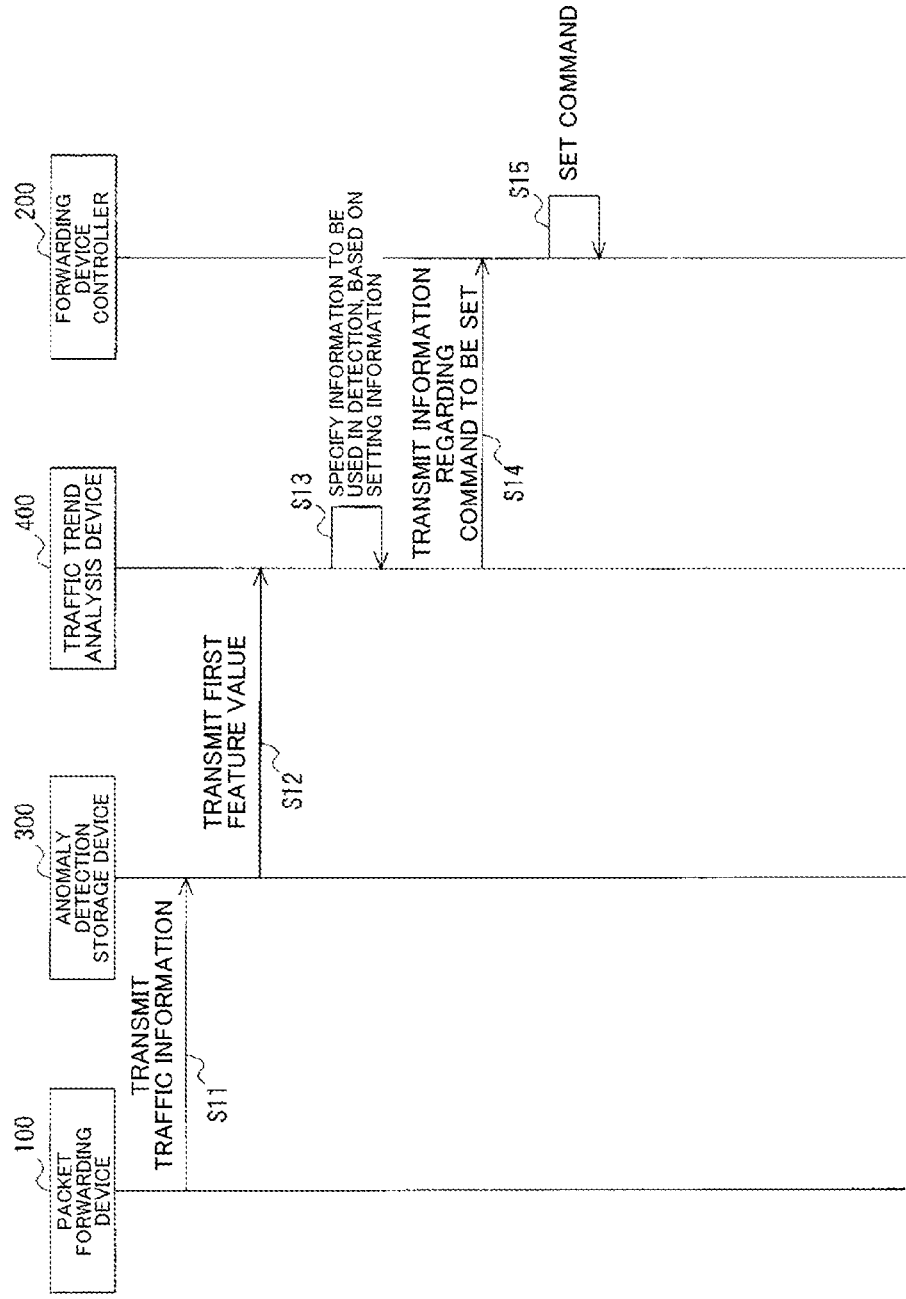
FIG. 22 shows a sequence for traffic trend analysis.
Figure 23:
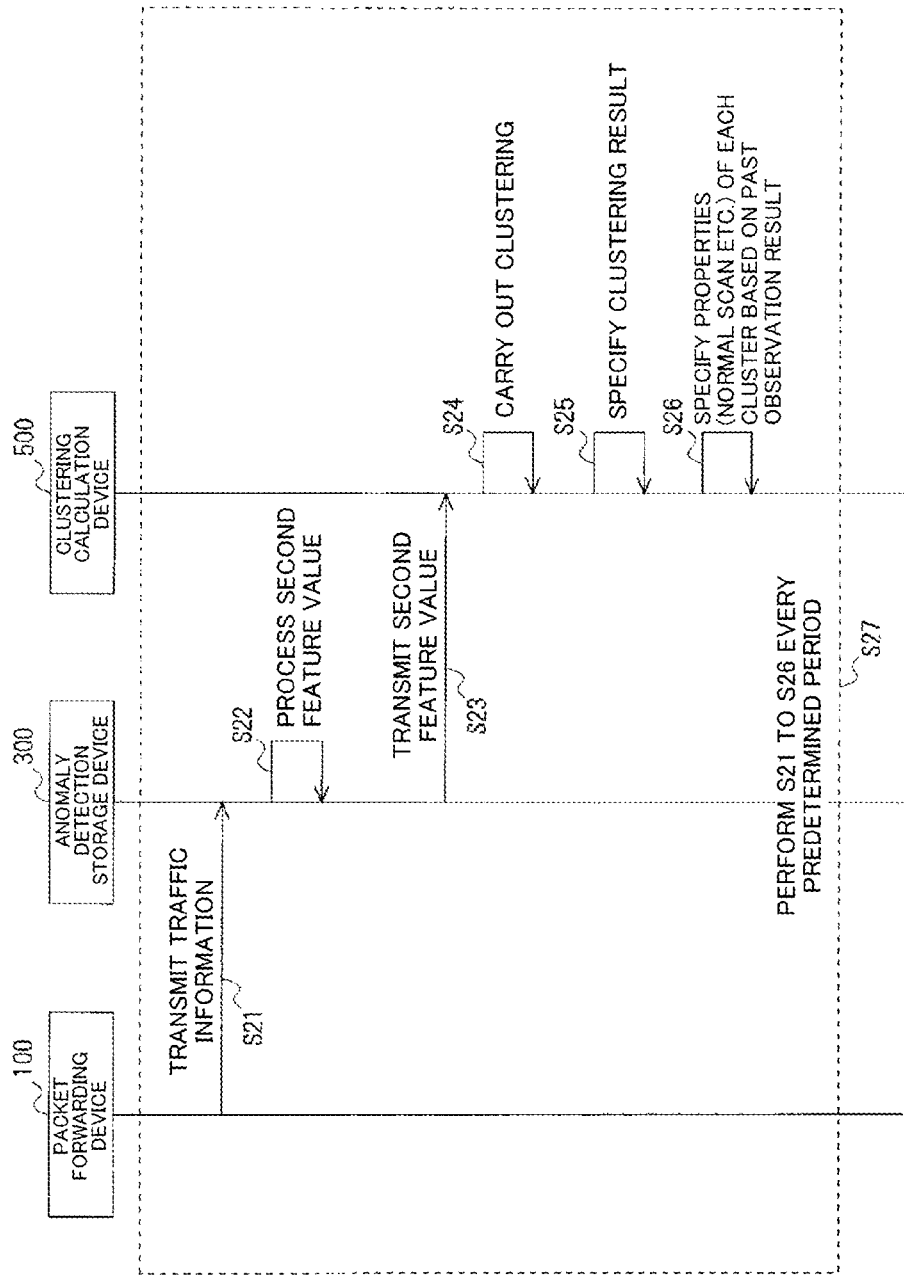
FIG. 23 is a sequence for carrying out clustering and specifying a class.
Figure 24:
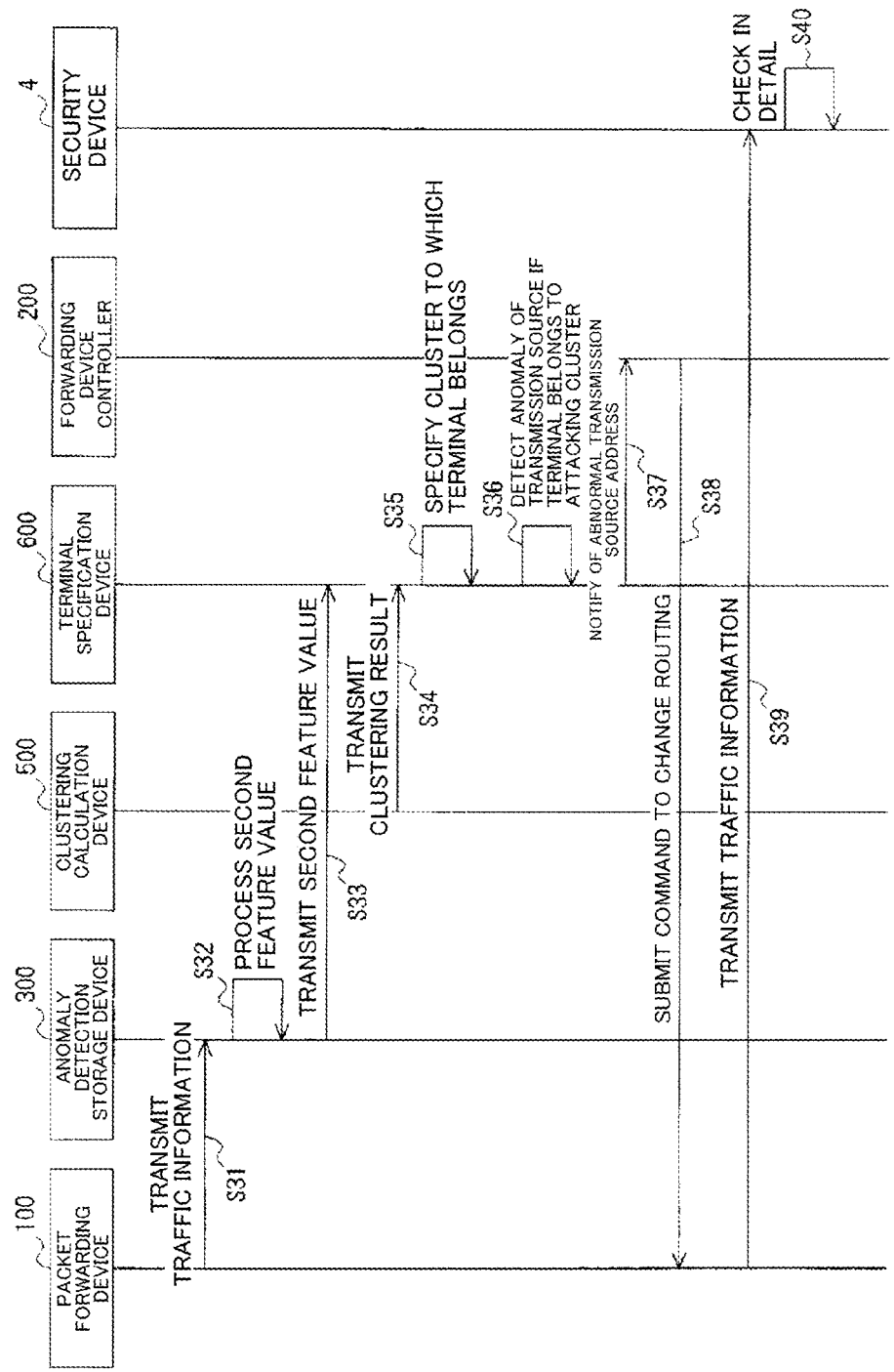
FIG. 24 is a sequence for detecting and dealing with an anomaly.

An operation of the infection-spreading attack detection system according to the present embodiment will be described with reference to FIGS. 22 to 24. First, a sequence for traffic trend analysis will be described with reference to a sequence chart in FIG. 22.

In this sequence, in the network configuration shown in FIG. 6, the anomaly detection storage device 300 acquires, from the packet forwarding device 100, traffic information regarding subdivided address spaces at fixed time intervals (step S11). The acquired traffic information is accumulated for a plurality of time widths in the anomaly detection storage device 300, and the traffic trend analysis device 400 analyzes the accumulated information to specify a set of M partial address spaces in which infection-spreading attacks can be accurately detected (steps S12, S13).

To globally detect anomalies in the telecommunication carrier network, the forwarding device controller 200 sets, to a plurality of packet forwarding devices 100, a command for acquiring information that can be used in detection (traffic information that serves as a source of the second feature values) from the M partial address spaces (steps S14, S15).

Next, a sequence for carrying out clustering and specifying a class will be described with reference to a sequence chart in FIG. 23.

In this sequence, in the network configuration shown in FIG. 6, the anomaly detection storage device 300 acquires, from the packet forwarding device 100, traffic information for each of the M subdivided partial address spaces at fixed time intervals (e.g. one month) (step S21). The acquired traffic information is stored in the anomaly detection storage device 300, and is processed into the second feature values based on predetermined calculation (step S22). The second feature values are transmitted to the clustering calculation device 500 (step S23). Next, the terminals 2 are grouped by inputting the second feature values to a clustering algorithm, and the results are stored (steps S24, S25). Properties of each cluster are specified using the grouping results, the past grouping results, and information regarding known scan terminals (public IP addresses of normal scan terminals) (step S26). Note that, since it is considered that the traffic trend periodically changes, steps S21 to S26 above are performed every predetermined period (e.g. once in two months) (step S27).

Next, a sequence for specifying and dealing with a terminal will be described with reference to a sequence chart in FIG. 24.

In this sequence, in the network configuration shown in FIG. 6, the anomaly detection storage device 300 acquires, from the packet forwarding device 100, traffic information for each of the M subdivided partial address spaces at fixed time intervals (e.g. at intervals of 20 minutes) (step S31). The acquired traffic information is stored in the anomaly detection storage device 300, and is processed into the second feature values for each transmission source address, based on predetermined calculation (step S32). The terminal specification device 600 performs calculations such as comparison using the processed second feature values and the clustering result information (steps S33, S34), and determines the cluster to which the transmission source belongs (step S35). Next, the terminal specification device 600 detects an anomaly of a transmission source if the cluster to which the transmission source belongs is an attacking scan cluster (step S36).

Next, the terminal specification device 600 transmits transmission source address information to the forwarding device controller 200, and thus, the forwarding device controller 200 changes routing of the packet forwarding device 100 (steps S37, S38). As a result, all communication from the transmission source address is pulled into the security device 4 (step S39), and infected terminals are checked in detail (step S40).

Although an embodiment of the present invention has been described above in detail, the present invention is not limited thereto. For example, although, in the above embodiment, the means for deriving the first feature values to be used to specify the M partial address spaces and the means for deriving the second feature values to be used to detect an infection-spreading attack are realized in the anomaly detection storage device 300, these means may be implemented as different devices.

Although, in the above embodiment, processing for configuring settings to the packet forwarding device 100 is performed by the forwarding device controller 200, the traffic trend analysis device 400 and the terminal specification device 600 may directly configure settings of the packet forwarding device 100.

Although the above embodiment has taken IPv4 as an example of an address space, the present invention can also be applied to any other kind of address space, such as IPv6.

The above embodiment has described, as examples of the second feature values, 1. the distribution (entropy) of destinations; 2. the number of destinations; 3. the number of port number types; 4. the ratio of the protocol in the IP header; 5. the length of an observation period; 6. dispersion of the number of destinations; and 7. the distribution of the number of packets in one flow. However, any other kind of information may also be used.

REFERENCE SIGNS LIST

1 Network
2 Terminal
3 Internet
4 Security device
100 Packet forwarding device
200 Forwarding device controller
300 Anomaly detection storage device
400 Traffic trend analysis device
500 Clustering calculation device
600 Terminal specification device

The invention claimed is:

1. An infection-spreading attack detection apparatus configured to detect an occurrence of an infection-spreading attack in a network in which a forwarding device configured to forward packets is provided, the apparatus comprising:
    first feature value deriving means for acquiring first traffic information regarding a packet forwarded by the forwarding device, and deriving a first feature value of traffic based on the first traffic information, for each of a plurality of partial address spaces obtained by subdividing an address space of the network;
    monitoring target determination means for determining M partial address spaces that are to be monitored, out of the plurality of partial address spaces, based on the first feature value derived by the first feature value deriving means;
    second feature value deriving means for acquiring second traffic information regarding a packet forwarded by the forwarding device, a destination or a transmission source of the packet being an address in the M partial address spaces determined by the monitoring target determination means, and deriving a second feature value of the traffic based on the second traffic information, for each address of a terminal located in the network;
clustering means for learning—the second feature value derived by the second feature value deriving means and classifying addresses of terminals into a plurality of clusters, and determining whether or not each of the clusters pertains to an infection-spreading attack, and generating cluster information; and
terminal specification means for specifying whether or not an infection-spreading attack has occurred and an address of a terminal that is an attack source, based on the second feature value derived by the second feature value deriving means and the cluster information generated by the clustering means.

2. The infection-spreading attack detection apparatus according to claim 1, wherein the clustering means generates clusters such that a terminal that performs an attacking scan pertaining to an infectious attack and a terminal that performs a normal scan pertaining to a check belong to different clusters.

3. The infection-spreading attack detection apparatus according to claim 1, wherein the second feature value includes a feature value indicating a difference in a mode of operation and a purpose of use.

4. The infection-spreading attack detection apparatus according to claim 3, wherein the second feature value includes, as the feature value indicating a difference in the mode of operation and the purpose of use, at least one of a length of an observation period in which traffic is observed in a predetermined period, dispersion of a number of destinations of traffic in a period from present to a predetermined period, or a distribution of a number of packets in one flow.

5. The infection-spreading attack detection apparatus according to claim 3, wherein the second feature value further includes a feature value indicating a property of scan communication.

6. The infection-spreading attack detection apparatus according to claim 1, wherein, upon specifying the terminal that is an attack source of an infection-spreading attack, the terminal specification means sets the forwarding device so as to forward a packet whose destination or transmission source is an address of the specified terminal to a predetermined security device.

7. A method with which an infection-spreading attack detection apparatus that is configured to detect an occurrence of an infection-spreading attack in a network in which a forwarding device configured to forward packets is provided and that is configured to specify a terminal that is an attack source of an infection-spreading attack, the method comprising:
acquiring first traffic information regarding a packet forwarded by the forwarding device;
deriving a first feature value of traffic based on the first traffic information, for each of a plurality of partial address spaces obtained by subdividing an address space of the network;
determining M partial address spaces to be monitored, out of the plurality of partial address spaces, based on the derived first feature value;
acquiring second traffic information regarding a packet forwarded by the forwarding device, a destination or a transmission source of the packet being an address in the M partial address spaces deriving a second feature value of the traffic based on the second traffic information, for each address of a terminal located in the network;
learning the second feature value;
classifying addresses of terminals into a plurality of clusters;
determining whether or not each of the clusters pertains to an infection-spreading attack and generating cluster information; and
specifying whether or not an infection-spreading attack has occurred and an address of a terminal that is an attack source, based on the second feature value and the cluster information.

8. A non-transitory computer readable medium which stores a program for causing a computer to be used for an infection-spreading attack detection apparatus to execute operations comprising:
acquiring first traffic information regarding a packet forwarded by the forwarding device;
deriving a first feature value of traffic based on the first traffic information, for each of a plurality of partial address spaces obtained by subdividing an address space of the network;
determining M partial address spaces to be monitored, out of the plurality of partial address spaces, based on the derived first feature value;
acquiring second traffic information regarding a packet forwarded by the forwarding device, a destination or a transmission source of the packet being an address in the M partial address spaces deriving a second feature value of the traffic based on the second traffic information, for each address of a terminal located in the network;
learning the second feature value;
classifying addresses of terminals into a plurality of clusters;
determining whether or not each of the clusters pertains to an infection-spreading attack and generating cluster information; and
specifying whether or not an infection-spreading attack has occurred and an address of a terminal that is an attack source, based on the second feature value and the cluster information.

9. The non-transitory computer readable medium according to claim 8, wherein the operations further comprise generating clusters such that a terminal that performs an attacking scan pertaining to an infectious attack and a terminal that performs a normal scan pertaining to a check belong to different clusters.

10. The non-transitory computer readable medium according to claim 8, wherein the second feature value includes a feature value indicating a difference in a mode of operation and a purpose of use.

11. The non-transitory computer readable medium according to claim 10, wherein the second feature value includes, as the feature value indicating a difference in the mode of operation and the purpose of use, at least one of a length of an observation period in which traffic is observed in a predetermined period, dispersion of a number of destinations of traffic in a period from present to a predetermined period, or a distribution of a number of packets in one flow.

12. The non-transitory computer readable medium according to claim 10, wherein the second feature value further includes a feature value indicating a property of scan communication.

13. The non-transitory computer readable medium according to claim 8, wherein, upon specifying the terminal that is an attack source of an infection-spreading attack, the operations further comprise setting the forwarding device so as to forward a packet whose destination or transmission source is an address of the specified terminal to a predetermined security device.

\* \* \* \* \*